United States Patent [19]

Nagasaki et al.

[11] Patent Number: 5,109,055
[45] Date of Patent: Apr. 28, 1992

[54] RUBBER COMPOSITION HAVING EXCELLENT DYNAMIC PROPERTIES

[75] Inventors: Hideo Nagasaki, Osaka; Naoki Inui, Yamatokoriyama; Shinichi Yachigo, Toyonaka, all of Japan

[73] Assignee: Sumitomo Chemical Company, Limited, Osaka, Japan

[21] Appl. No.: 548,560

[22] Filed: Jul. 5, 1990

[30] Foreign Application Priority Data

Jul. 24, 1989 [JP] Japan .................... 1-191658
Dec. 6, 1989 [JP] Japan .................... 1-318265

[51] Int. Cl.$^5$ .............................. C08L 9/00
[52] U.S. Cl. ...................... 524/571; 524/105; 524/358
[58] Field of Search .............. 524/571, 358, 105

[56] References Cited

U.S. PATENT DOCUMENTS 3,756,969 9/1973 Danielson .
4,257,926 3/1981 Tanimura et al. .
4,803,250 2/1989 Nagasaki et al. .

FOREIGN PATENT DOCUMENTS 253365 1/1988 European Pat. Off. .
560245657 12/1985 Japan ...................... 524/105
63-86728 4/1988 Japan .
63-150338 6/1988 Japan .
563286445 11/1988 Japan ...................... 524/105

OTHER PUBLICATIONS

J. Van Alphen et al.: "Rubber Chemicals", 1973, p. 148, Publishing Co., Dordrecht, NL.
Database Chemical Abstracts (Host: STN), 1982, No. 97, No. 4, Abstracts No. 25013x, Columbus, Ohio, U.S.; & JP-A-57 042 744 (Yokohama Rubber Co.), Oct. 3, 1982.
International Polymer Science and Technology, vol. 4, No. 12, 1977, pp. T48-T50, Rubber and Plastics Research Association of Great Britain, Awburg, G.B.; A. S. Prashchikina et al.: "High-Temperature Curing of General-Purpose Rubbers with a Curing System Comprising a Bismaleimide and Sulphur".

*Primary Examiner*—Paul R. Michl
*Assistant Examiner*—John J. Guarriello
*Attorney, Agent, or Firm*—Stevens, Davis, Miller & Mosher

[57] ABSTRACT

A rubber composition comprising a base rubber, carbon black and a dinitrodiamine compound represented by the formula [I],

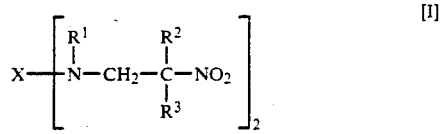

wherein X is a divalent aliphatic, alicyclic or aromatic group which may contain halogen or oxygen in the group, $R^1$ is hydrogen or an aliphatic, alicyclic or aromatic group, provided that two nitrogen atoms linking through X may further link through $R^1$ when both X and $R^1$ are the aliphatic groups, and $R^2$ and $R^3$ independently of one another are each hydrogen or an alkyl of 1 to 12 carbon atoms, provided that $R^2$ and $R^3$ may conjointly form a ring, is improved in its scorching without deterioration in its dynamic properties by incorporating thereto the following components (A) or (B):

(A) N-(cyclohexylthio)phthalimide and a bismaleimide compound, or
(B) 2,3,5,6-tetrachloro-1,4-benzoquinone.

18 Claims, No Drawings

RUBBER COMPOSITION HAVING EXCELLENT DYNAMIC PROPERTIES

The present invention relates to a rubber composition which is stable in scorching and has excellent dynamic properties.

In recent years, the automobile industry has increased various demands for improving properties of articles and parts. For example, in rubber products such as tires and rubber vibration isolators, the important tasks to be settled are the pursuit of economy including reduction of fuel consumption, progress in durability, extension of running life and the like, as well as the improvement in riding comfortableness including reduction of vibration and noise and the like. Thus, it has become important how to improve properties of vulcanized rubber applied for such rubber products, which properties include dynamic properties such as resilience and heat build-up resistance and vibration isolator properties such as dynamic-to-static modulus ratio. These properties will be hereunder referred to as dynamic properties en bloc.

In order to improve the dynamic properties, such methods are known as improvement in microstructure or molecular weight distribution of the rubber, improvement in compounding manner of organic rubber chemicals or reinforcing agents, and addition of dynamic property improvers. Among them, the addition of dynamic property improvers is drawing public attention, since it can improve the dynamic properties more easily than other methods and can be applied also to a natural rubber.

As the dynamic property improvers, there have hitherto been known nitroso compounds such as 4-nitroso-N-(2-nitro-2-methylpropyl)aniline and 5-nitroso-8-hydroxyquinoline. However, since the health problem of nitrosoamines has come to a social matter, the nitroso compounds have become troublesome for the usage. Then as dynamic property improvers containing no nitroso group, 8-hydroxyquinoline derivatives have been proposed in JP-A-58-118837, and nitro compounds containing sulfur have been proposed in JP-A-59-18740. Though these compounds have been effective for improving resilience and heat build-up resistance, they have had a problem to deteriorate flex cracking resistance.

On the other hand, dinitrodiamine compounds represented by the formula [I],

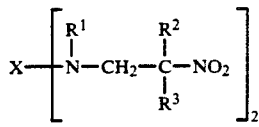

wherein X is a divalent aliphatic, alicyclic or aromatic group which may contain halogen or oxygen in the group, $R^1$ is hydrogen or an aliphatic, alicyclic or aromatic group, provided that two nitrogen atoms linking through X may further link through $R^1$ when both X and $R^1$ are the aliphatic groups, and $R^2$ and $R^3$ independently of one another are each hydrogen or an alkyl of 1 to 12 carbon atoms, provided that $R^2$ and $R^3$ may conjointly form a ring,
are disclosed in EP-A-253365, and they produce rubber compositions of excellent dynamic properties without inducing the above-mentioned problems when they are incorporated into rubber.

These dinitrodiamine compounds are intended for the application to the tires and rubber vibration isolators, because they impart good dynamic properties to the rubber. However, these dinitrodiamine compounds tend to accelerate the scorching of the rubber because of their basicity, although they show improved scorching if compared with the above-mentioned 8-hydroxyquinoline derivatives, etc. Under the existing status, therefore, the rubber compositions containing the dinitrodiamine compounds are forcing the alteration of their processing manner and vulcanizing period from those of containing no such compounds.

In order to retard the scorching, it is conventionally known to add a scorch retarder, and in particular, N-(cyclohexylthio)phthalimide is largely used. This compound is effective to retard the scorching, but has practical problems to deteriorate the dynamic properties and to cause blooming, which necessitate to minimizing its loading amount.

Under such circumstances, the present inventors have made intensive research to develop a rubber composition which effectively exhibits the most of the dynamic properties, characteristics of the dinitrodiamine compounds, and is also stable in scorching, and resultantly have accomplished the present invention.

Thus, the present invention provides a rubber composition comprising a base rubber of a natural and/or synthetic rubber, carbon black and, based on 100 parts by weight of the base rubber, 0.1 to 10 parts by weight of a dinitrodiamine compound represented by the above formula [I] in combination with the following components (A) or (B):

(A) 0.05 to 0.3 part by weight of N-(cyclohexylthio)phthalimide and 0.05 to 1 part by weight of a bismaleimide compound represented by the formula [II],

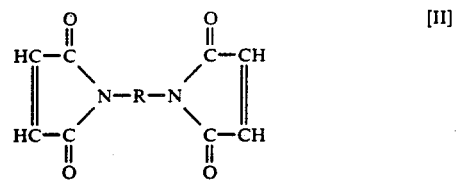

where R is a divalent aliphatic, alicyclic or aromatic group which may contain a hetero atom in the group, or (B) 0.1 to 3 parts by weight of 2,3,5,6-tetrachloro-1,4-benzoquinone.

The dinitrodiamine compounds of the formula [I] employed in the present invention include, for example, the following compounds, wherein -Z represents a group of the formula of

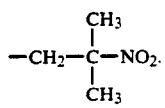

 (1)
 (2)
 (3)
 (4)
 (5)
 (6)
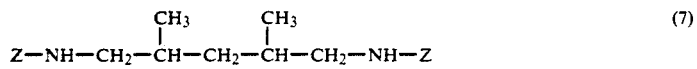 (7)
 (8)
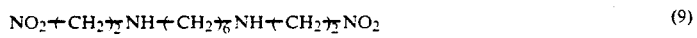 (9)
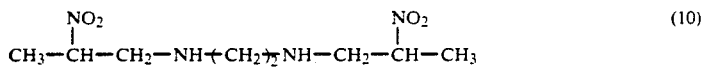 (10)
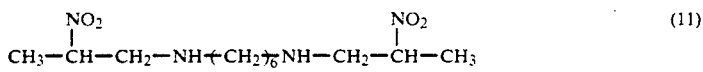 (11)
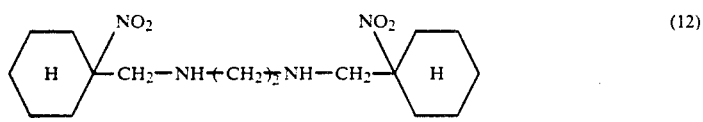 (12)
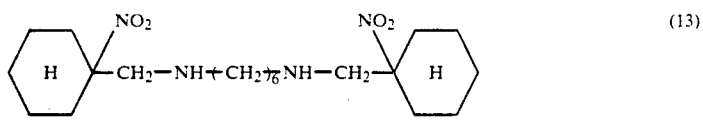 (13)
 (14)
(15)
 (16)
 (17)
(18)
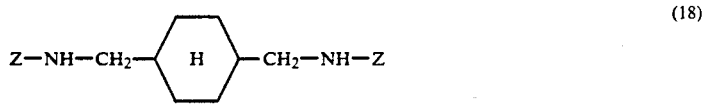

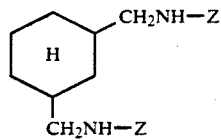 (19)
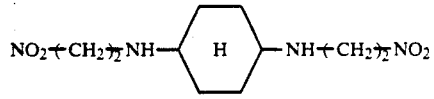 (20)
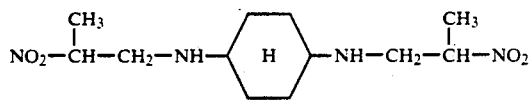 (21)
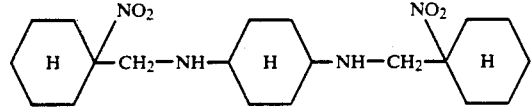 (22)
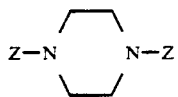 (23)
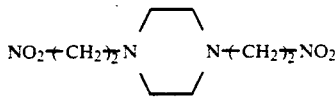 (24)
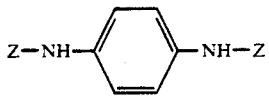 (25)
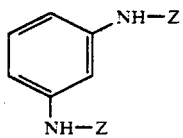 (26)
 (27)
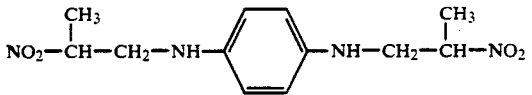 (28)
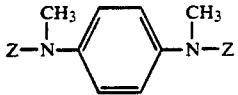 (29)
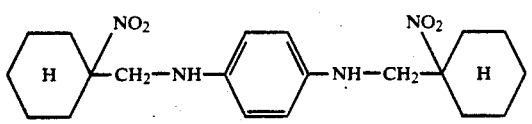 (30)
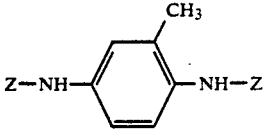 (31)

-continued
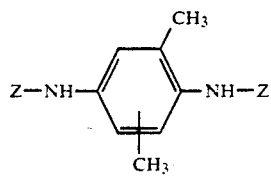
(32)
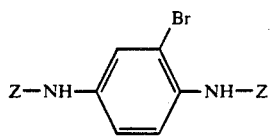
(33)
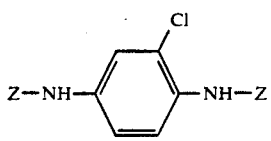
(34)
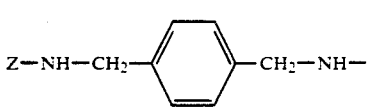
(35)
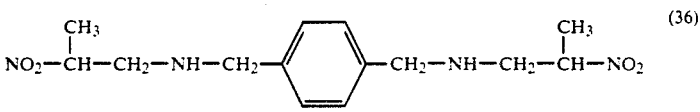
(36)
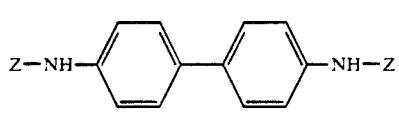
(37)
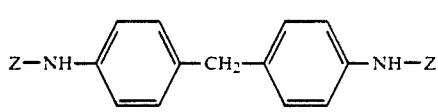
(38)
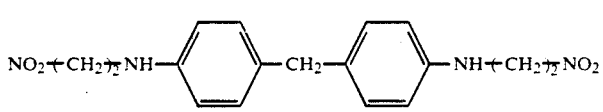
(39)
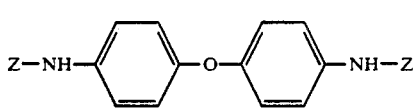
(40)
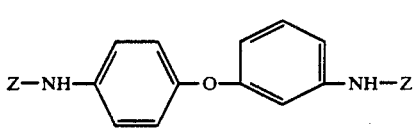
(41)
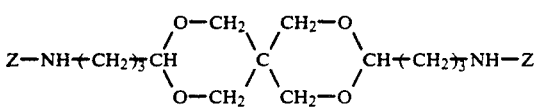
(42)
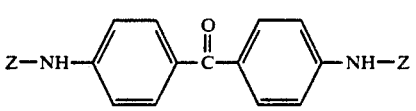
(43)

-continued

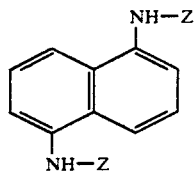
(44)

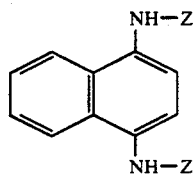
(45)

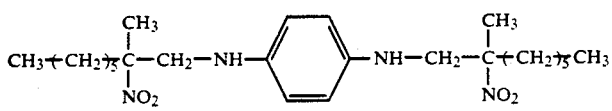
(46)

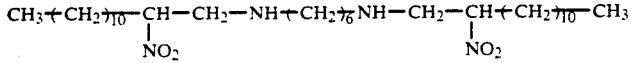
(47)

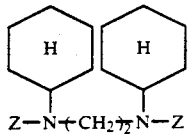
(48)

As exemplified above, the bridging group X in the formula [I] is a divalent aliphatic, alicyclic or aromatic group. X may contain halogen (e.g. fluorine, chlorine, bromine and iodine) in the group as in the 33rd and 34th examples, and alternatively may contain oxygen in the group as in the 40Th to 43rd examples. The divalent aliphatic group denoted by X includes, for example, a straight chain or branched chain group, preferably an alkylene, of 1 to 18 carbon atoms and the like. The divalent alicyclic group denoted by X includes, for example, cyclohexylene,

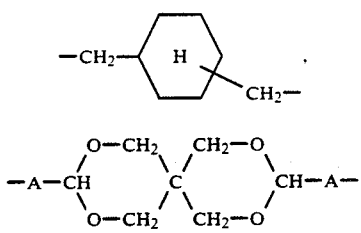

in which A is a lower alkylene, and the like. The divalent aromatic group denoted by X includes, for example, phenylene unsubstituted or substituted once or twice by lower alkyl (e.g. methyl) or halogen (e.g. chlorine or bromine),

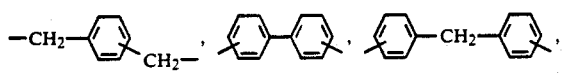

naphthylene and the like. Among them, preferred X is the aliphatic group. More preferably, X is the aliphatic group, particularly the alkylene, of 4 to 12 carbon atoms.

$R^1$ in the formula [I] is hydrogen or an aliphatic, alicyclic or aromatic group. The aliphatic group denoted by $R^1$ includes an alkyl of 1 to 6 carbon atoms and the like, the alicyclic group denoted by $R^1$ includes cyclopentyl, cyclohexyl and the like, and the aromatic group denoted by $R^1$ includes phenyl, tolyl and the like. Among them, preferred $R^1$ is hydrogen, the alkyl, cyclohexyl or phenyl, and more preferred is hydrogen. Alternatively, in case both X and $R^1$ are the aliphatic groups, two nitrogen atoms linking through X can further link through $R^1$ to form a ring composed of X, $R^1$ and two nitrogen atoms as in the above 23rd and 24th examples. Such rings include, for example, piperazine ring and the like.

$R^2$ and $R^3$ in the formula [I] can be the same or different from each other, and are hydrogen or an alkyl of 1 to 12 carbon atoms. Preferably, at least one of $R^2$ and $R^3$ is an alkyl of 1 to 12 carbon atoms, and more preferably they are both methyl. Alternatively, $R^2$ and $R^3$ can conjointly link to form, together with carbon atoms bonding to them, rings such as six-membered rings, like the above 12th, 13th, 22nd and 30th examples.

These dinitrodiamine compounds can be incorporated into the rubber in any forms, for example, as a single compound, as a mixture of two or more compounds, as a mixture with a carrier such as clay which does not affect the properties of the rubber, or as a mixture with other additives such as N-(cyclohexylthio)phthalimide, bismaleimide compounds and 2,3,5,6-tetrachloro-1,4-benzoquinone which are the other components of the present invention or with various additives described later. Thus, they may be added to the rubber in any of these forms.

The amount of the dinitrodiamine compound to be added is from 0.1 to 10 parts by weight, preferably 0.2 to 3 parts by weight, based on 100 parts by weight of the rubber, since too small amount is insufficient for the effect to improve the dynamic properties, and too large amount is uneconomical.

According to the present invention, in addition to the above dinitrodiamine compound, the following components (A) or (B) are further added to the rubber:

(A) N-(cyclohexylthio)phthalimide and a bismaleimide compound represented by the above formula [II], or (B) 2,3,5,6-tetrachloro-1,4-benzoquinone.

When the components (A), i.e. N-(cyclohexylthio)phthalimide and the bismaleimide compound, are applied, the former N-(cyclohexylthio)phthalimide is used in an amount of 0.05 to 0.3 part by weight based on 100 parts by weight of the rubber, since too small amount is insufficient for the effect to improve the scorching, and too large amount causes degradation in the dynamic properties or blooming.

The latter bismaleimide compound represented by the formula [II] includes, for example, the following:
N,N'-ethylenebismaleimide,
N,N'-hexamethylenebismaleimide,
N,N'-dodecamethylenebismaleimide,
N,N'-(2,2,4-trimethylhexamethylene)-bismaleimide,
N,N'-(oxydipropylene)bismaleimide,
N,N'-(aminodipropylene)bismaleimide,
N,N'-(ethylenedioxydipropylene)bismaleimide,
N,N'-(1,4-cyclohexylene)bismaleimide,
N,N'-(1,3-cyclohexylene)bismaleimide,
N,N'-(methylene-1,4-dicyclohexylene)-bismaleimide,
N,N'-(isopropylidene-1,4-dicyclohexylene)-bismaleimide,
N,N'-(oxy-1,4-dicyclohexylene)bismaleimide,
N,N'-(m-phenylene)bismaleimide,
N,N'-(p-phenylene)bismaleimide,
N,N'-(o-phenylene)bismaleimide,
N,N'-(1,3-naphthylene)bismaleimide,
N,N'-(1,4-naphthylene)bismaleimide,
N,N'-(1,5-naphthylene)bismaleimide,
N,N'-(3,3'-dimethyl-4,4'-biphenylene)-bismaleimide,
N,N'-(3,3'-dichloro-4,4'-biphenylene)-bismaleimide,
N,N'-(2,4-pyridinediyl)bismaleimide,
N,N'-(2,6-pyridinediyl)bismaleimide,
N,N'-(4-methyl-2,6-pyridinediyl)bismaleimide,
N,N'-(1,4-anthraquinonediyl)bismaleimide,
N,N'-(4-methyl-1,3-phenylene)bismaleimide,
N,N'-(5-methyl-1,3-phenylene)bismaleimide,
N,N'-(2-methyl-1,3-phenylene)bismaleimide,
N,N'-(2-methyl-1,4-phenylene)bismaleimide,
N,N'-(4,6-dimethyl-1,3-phenylene)bismaleimide,
N,N'-(4,5-dimethyl-1,3-phenylene)bismaleimide,
N,N'-(2,4-dimethyl-1,3-phenylene)bismaleimide,
N,N'-(2,5-dimethyl-1,3-phenylene)bismaleimide,
N,N'-(2,3-dimethyl-1,4-phenylene)bismaleimide,
N,N'-(2,5-dimethyl-1,4-phenylene)bismaleimide,
N,N'-(2,6-dimethyl-1,4-phenylene)bismaleimide,
N,N'-(4,6-dichloro-1,3-phenylene)bismaleimide,
N,N'-(5-chloro-1,3-phenylene)bismaleimide,
N,N'-(5-hydroxy-1,3-phenylene)bismaleimide,
N,N'-(5-methoxy-1,3-phenylene)bismaleimide,
N,N'-(methylenedi-p-phenylene)bismaleimide,
N,N'-(isopropylidenedi-p-phenylene)-bismaleimide,
N,N'-(oxydi-p-phenylene)bismaleimide,
N,N'-(thiodi-p-phenylene)bismaleimide,
N,N'-(dithiodi-p-phenylene)bismaleimide,
N,N'-(sulfonyldi-p-phenylene)bismaleimide, and
N,N'-(carbonyldi-p-phenylene)bismaleimide.

R in the formula [II] is a divalent aliphatic, alicyclic or aromatic group which may contain hetero atoms such as O, N and S, and may be, for example, oxydialkylene, aminodialkylene, alkylendioxydialkylene, oxydicyclohexylene, pyridinediyl, anthraquinonediyl, oxydiphenylene, thiodiphenylene, dithiodiphenylene, sulfonyldiphenylene and carbonyldiphenylene. The aliphatic, alicyclic and aromatic groups which constitute R may be substituted, respectively. The substituents for the aliphatic group include halogen (e.g. chlorine and bromine), hydroxy, lower (e.g. $C_1$ to $C_4$) alkoxy and the like. The substituents for the alicyclic or aromatic group include lower (e.g. $C_1$ to $C_4$) alkyl, halogen (e.g. chlorine and bromine), hydroxy, lower (e.g. $C_1$ to $C_4$) alkoxy and the like.

Among them, the bismaleimide compound wherein R in the formula [II] is an aromatic group of 6 to 8 carbon atoms or an aliphatic group, particularly an alkylene, of 4 to 8 carbon atoms is preferably used.

The amount of the bismaleimide compound [II] is 0.05 to 1 part by weight, preferably 0.1 to 0.5 part by weight, based on 100 parts by weight of the rubber, since too small amount is insufficient for the effect to improve the scorching, and too large amount causes increase in crosslinking density to lower the elongation, which is undesirable for some rubber products.

The bismaleimide compound of the formula [II] applied in the present invention is known per se in U.S. Pat. No. 4,803,250 in which it is added to a rubber in order to improve, for example, the reverse vulcanization of the rubber, but its usage in combination with the dinitrodiamine compound represented by the formula [I] and N-(cyclohexylthio)phthalimide is revealed for the first time in the present invention. Particularly in the present invention, upon maintaining the excellent dynamic properties attained by the dinitrodiamine compound of the formula [I] at the maximum, and in order to improve the scorching accelerated by the dinitrodiamine compound, the bismaleimide compound is added in a particular amount in combination with N (cyclohexylthio)phthalimide, by which a composition having neither deterioration in dynamic properties nor blooming has just been obtained.

On the other hand, when the component (B), i.e. 2,3,5,6-tetrachloro-1,4-benzoquinone, is applied, it is used in an amount of 0.1 to 3 parts by weight based on 100 parts by weight of the rubber, since too small amount is insufficient for the effect to improve the scorching, and too large amount causes deterioration in mechanical properties and so forth.

This 2,3,5,6-tetrachloro-1,4-benzoquinone is known per se in U.S. Pat. No. 4,257,926, JP-A-63-86728 and so on in which it is added to a rubber in order to improve, for example, the adhesiveness of the rubber, but its usage in combination with the dinitrodiamine compound represented by the formula [I] is revealed for the first time in the present invention. Particularly in the present invention, upon maintaining the excellent dynamic properties attained by the dinitrodiamine compound of the formula [I] at the maximum, and in order to improve the scorching accelerated by the dinitrodiamine compound, 2,3,5,6-tetrachloro-1,4-benzoquinone is added in a particular amount, by which a composition having excellent dynamic properties and exhibiting no blooming has just been obtained. In this embodiment, known scorch retarders such as phthalic anhydride and N-(cyclohexylthio)phthalimide may be used in combination with 2,3,5,6-tetrachloro-1,4-benzoquinone. When the scorch retardars are used, their amount is preferably from about 0.05 to 0.3 part by weight based on 100 parts by weight of the rubber.

Rubbers applicable in the present invention include, for example, natural rubbers and various kinds of synthetic rubbers such as polyisoprene rubber, styrene-butadiene copolymer rubber, polybutadiene rubber, acrylonitrile-butadiene copolymer rubber, isoprene-isobutylene copolymer rubber and ethylene-propylene-diene terpolymer rubber, and they can be used each alone or as a blend of two or more of the rubbers. Among them, preferred is a natural rubber alone or a blend mainly composed of, i.e. 50% by weight or more of, a natural rubber and compounded with a synthetic rubber. Alternatively, styrene-butadiene copolymer rubber or a blend mainly composed of, i.e. 50% by weight or more of, styrene-butadiene copolymer rubber and compounded with a natural rubber or with butadiene rubber is also preferred, when the component (B), i.e. 2,3,5,6-tetrachloro-1,4-benzoquinone, is applied.

Natural rubber materials are largely used for tires of large size vehicles and for rubber vibration isolators, while styrene-butadiene copolymer rubber materials are largely used for tires of passenger cars. In order to increase the dynamic properties of such materials and also to improve the scorching, it is effective to blend them with the dinitrodiamine compound of the above formula [I] and the components (A) or (B) according to the present invention.

If the present invention is applied to the styrene-butadiene copolymer rubber materials, in particular by using 2,3,5,6-tetrachloro-1,4-benzoquinone, the dynamic properties such as resilience and heat build-up resistance are still more improved in the vulcanized rubber as compared with the case where only the dinitrodiamine compound of the above formula [I]is incorporated. The styrene-butadiene copolymer rubber may be a emulsion polymerized type and may be a solution polymerized type. Further, the present invention can produce excellent dynamic properties against the rubbers improved in microstructures or molecular weight distributions, and also against modified rubbers.

As to the carbon black, various ones having different reinforcing power and conventionally used in the rubber industry, for example, SAF, ISAF, HAF, SPF, FEF, GPF, SRF, MT and the like can also be applied in the present invention, and its kind is not critical. When the base rubber is a styrene-butadiene copolymer rubber material, preferred carbon black is those having a nitrogen absorption specific surface area of 30 to 130 m$^2$/g, for example, ISAF, HAF, FEF and the like. The amount of the carbon black is also not limitative, but is normally in a range of from about 10 to about 150 parts by weight based on 100 parts by weight of the rubber. Preferred amount of the carbon black against the styrene-butadiene copolymer rubber materials is in a range of from about 10 to about 80 parts by weight based on 100 parts by weight of the rubber.

In the present invention, other additives conventionally used in the rubber industry can of course be applied in compliance with the purpose of the composition. Such additives usually used include, for example, various vulcanization accelerators such as thiazoles, thiurams, dithio acids and guanidines, sulfur, fillers, stearic acid, peptizers, zinc oxide, process oils, processing aids, antioxidants, anti-ozonants, waxes and the like. Kinds and amounts of these additives can be selected when the occasion demands, and they are not limitative in the present invention.

In general, when a natural or synthetic rubber is compounded with additives, the compounding is in principle carried out in two steps. Thus, fillers such as carbon black and others, process oil, stearic acid, etc. are added to the rubber at a first step of the relatively higher rubber temperature of from about 120° to about 220° C., while vulcanization accelerators and vulcanizing agents are added at a second step of the relatively lower temperature of from about 40° to about 120° C.

Compounding of the dinitrodiamine compound represented by the formula [I] and the components (A) or (B) according to the present invention may be effected at any stage, and when they ar compounded is not limitative. However, the dinitrodiamine compound is preferably added at the first step when the carbon black etc. are incorporated, and its blending temperature is preferably from about 140° to about 200° C., since the higher temperature is more effective to the improvement in rubber properties.

When the components (A), i.e. N-(cyclohexilthio)phthalimide and the bismaleimide compound, are used, they are preferably added at the second step of the relatively lower temperature, because their first step addition at a high temperature will cause the degradation in the dynamic properties. On the other hand, when the component (B), i.e. 2,3,5,6-tetrachloro-1,4-benzoquinone, is used, it can be added at any stage.

The rubber compositions of the present invention are preferably used as various parts of tires, particularly as a tread material, or as rubber vibration isolators. For example, the rubber compositions can be applied as a tread material or other tire materials, and are formed to tires by a usual manner employed in the tire industry. Alternatively, the rubber compositions can be formed to rubber vibration isolators by molding them to suitable shapes or by fixing them on metals.

The present invention will be explained hereunder in more detail with reference to the examples, which are only illustrative but not limitative to the present invention. In the examples, given parts are by weight unless otherwise indicated.

Dinitrodiamine compounds and bismaleimide compounds used in the examples are as follows, and they will be hereinafter referred to by the following marks.

Dinitrodiamine compounds

A : N,N'-bis(2-methyl-2-nitropropyl)-1,6-diaminohexane

B : N,N'-bis(2-methyl-2-nitropropyl)-1,4-diaminobutane

C : N,N'-bis(2-methyl-2-nitropropyl)-1,12-diaminododecane

D : N,N'-bis(2-methyl-2-nitropropyl)-1,4-diaminobenzene

E : N,N'-bis(2-methyl-2-nitropropyl)-4,4'-diaminodiphenylmethane

Bismaleimide compounds

F : N,N'-(m-phenylene)bismaleimide

G : N,N'-hexamethylenebismaleimide

EXAMPLE 1

[Compounding Formulation]

| | |
|---|---|
| Natural rubber | 100 parts |
| HAF black | 45 parts |
| Stearic acid | 3 parts |
| Aromatic process oil | 3 parts |
| Zinc oxide | 5 parts |
| Antioxidant (N-Phenyl-N'-1,3-dimethylbutyl-p-phenylenediamine) | 2 parts |
| Vulcanization accelerator (N-t-Butyl-2-benzothiazylsulfenamide) | 1 part |
| Sulfur | 2 parts |
| Dinitrodiamine compound N-(Cyclohexylthio)phthalimide Bismaleimide compound | Shown in Table 1 |

Using a 250 ml Laboplastomill manufactured by Toyo Seiki Co. as a Bumbury's mixer, the dinitrodiamine compound, carbon black, stearic acid, process oil and zinc oxide were charged into the basal natural rubber in accordance with the above compounding formulation at an oil bath temperature of 170° C., and the mixture was kneaded for 5 minutes with a mixer revolution of 60 rpm. The rubber temperature was 150° to 160° C. at the kneading.

The rubber blend was then transferred to an open mill and kneaded while adding thereto the N-(cyclohexylthio)phthalimide, bismaleimide compound, antioxidant, vulcanization accelerator and sulfur shown in the above formulation at a temperature of 60° to 70° C. A part of the kneaded mixture was subjected to a Mooney scorching test as mentioned below.

On the other hand, the kneaded mixture was vulcanized with a vulcanizing press at 145° C. for 25 minutes, and thereafter the vulcanized rubber was subjected to the below-mentioned various tests other than the Mooney scorching. The test results are summarized in Table 1.

The test methods are as follows:

(1) Mooney Scorching

A rubber blend before vulcanization was tested in accordance with JIS K-6300, and the time required for increasing in 5 points from the lowest value at 125° C. was determined as a scorch time.

(2) Resilience

It was determined by using a Lüpke type tester.

(3) Heat Build-up Resistance

It was tested in accordance with ASTM D-623-58. Thus, a Goodrich type heat build-up tester was used under a load of 35 lbs., a stroke of 6.35 mm, a frequency of 1800 rpm and a chamber temperature of 40° C., and a heat build-up temperature was determined with the difference between the initial rubber temperature and the rubber temperature after 40 minutes.

(4) 60° C. tan δ (loss factor)

It was determined under a static load of 300 g, a frequency of 50 Hz and a temperature of 60° C., using a viscoelasticity spectrometer manufactured by Iwamoto Seisakusho Co. The smaller value means the lower rolling resistance.

(5) Dynamic-To-Static Modulus Ratio

It was determined at a temperature of 25° C. and under a vibration frequency of 100 Hz, using a viscoelasticity spectrometer manufactured by Iwamoto Seisakusho Co.

(6) Tensile stress ($M_{300}$)

It was determined in accordance with JIS K-6301 by using a dumbbell specimen.

(7) Blooming

A vulcanized rubber sheet was left in an atmosphere having a temperature of 25° C. and the humidity of 50% for 2 weeks, thereafter the surface of the vulcanized rubber was visually observed, and the sheet of no blooming was marked as ◯, while the bloomed sheet was marked as x.

TABLE 1

| | | Run No. | | | | | | | | | | |
|---|---|---|---|---|---|---|---|---|---|---|---|---|
| | | Comparison | | | | Invention | | | | | | |
| | | 1 | 2 | 3 | 4 | 5 | 6 | 7 | 8 | 9 | 10 | 11 |
| Blend (part) | Dinitrodiamine A | 1 | 1 | 1 | 1 | 1 | 1 | 1 | | | | |
| | B | | | | | | | | 1 | | | |
| | C | | | | | | | | | 1 | | |
| | D | | | | | | | | | | 1 | |
| | E | | | | | | | | | | | 1 |
| | N-(Cyclohexylthio)phthalimide | | 0.3 | 0.6 | | 0.15 | 0.3 | 0.3 | 0.3 | 0.3 | 0.3 | 0.3 |
| | Bismaleimide F | | | | 1.5 | 0.6 | 0.3 | | 0.3 | 0.3 | 0.3 | 0.3 |
| | G | | | | | | | 0.3 | | | | |
| Rubber properties | Scorch time (min.) | 12.5 | 17.5 | 24.5 | 17.2 | 23.0 | 24.0 | 24.1 | 23.8 | 24.2 | 24.1 | 24.0 |
| | Resilience (%) | 70 | 68 | 66 | 71 | 71 | 71 | 71 | 71 | 71 | 70 | 70 |
| | Heat build-up temperature (°C.) | 30 | 32 | 35 | 29 | 28 | 29 | 29 | 29 | 29 | 30 | 30 |
| | 60° C. tan δ | 0.065 | 0.070 | 0.081 | 0.061 | 0.062 | 0.061 | 0.062 | 0.062 | 0.063 | 0.063 | 0.064 |
| | Dynamic-to-static modulus ratio | 1.92 | 2.00 | 2.02 | 2.04 | 1.90 | 1.90 | 1.91 | 1.90 | 1.91 | 1.91 | 1.90 |
| | $M_{300}$ (kg/cm2) | 162 | 161 | 158 | 184 | 164 | 164 | 165 | 163 | 164 | 165 | 163 |

TABLE 1-continued

| | Run No. | | | | | | | | | | |
|---|---|---|---|---|---|---|---|---|---|---|---|
| | Comparison | | | | Invention | | | | | | |
| | 1 | 2 | 3 | 4 | 5 | 6 | 7 | 8 | 9 | 10 | 11 |
| Blooming | o | o | x | o | o | o | o | o | o | o | o |

EXAMPLE 2

| [Compounding Formulation] | |
|---|---|
| Natural rubber | 70 parts |
| SBR 1500 | 30 parts |
| HAF black | 45 parts |
| Stearic acid | 3 parts |
| Aromatic process oil | 5 parts |
| Zinc oxide | 5 parts |
| Antioxidant (2,2,4-Trimethyl-1,2-dihydroquinoline polymer) | 2 parts |
| Vulcanization accelerator (N-Cyclohexyl-2-benzothiazylsulfenamide) | 1 part |
| Sulfur | 2 parts |
| Dinitrodiamine compound N-(Cyclohexylthio)phthalimide Bismaleimide compound | Shown in Table 2 |

Based on the above compounding formulation in which the basal rubber was a blend of the natural rubber with the styrene-butadiene copolymer rubber, the same experiment as in Example 1 was carried out, but the vulcanization was effected at 155° C. for 30 minutes. The test results are summarized in Table 2.

| [Compounding Formulation] | |
|---|---|
| p-phenylenediamine) | |
| Vulcanization accelerator | |
| N-Cyclohenyl-2-benzothiazylsulfenamide | 1 part |
| Tetramethylthiuram disulfide | 1 part |
| Sulfur | 2 parts |
| Dinitrodiamine compound 2,3,5,6-Tetrachloro-1,4-benzoquinone N-(Cyclohexylthio)phthalimide | Shown in Table 3 |

Using a 250 ml Laboplastomill manufactured by Toyo Seiki Co. as a Bumbury's mixer, the dinitrodiamine compound, carbon black, stearic acid and zinc oxide were charged into the basal natural rubber in accordance with the above compounding formulation at an oil bath temperature of 170° C., and the mixture was kneaded for 5 minutes with a mixer revolution of 60 rpm. The rubber temperature was 150° to 160° C. at the kneading.

The rubber blend was then transferred to an open mill and kneaded while adding thereto the 2,3,5,6-tetrachloro-1,4-benzoquinone, N-(cyclohexylthio)-phthalimide, antioxidant, vulcanization accelerators and sulfur

TABLE 2

| | | Run No. | | | | | | | | | | |
|---|---|---|---|---|---|---|---|---|---|---|---|---|
| | | Comparison | | | | Invention | | | | | | |
| | | 12 | 13 | 14 | 15 | 16 | 17 | 18 | 19 | 20 | 21 | 22 |
| Blend (part) | Dinitrodiamine A | 1 | 1 | 1 | 1 | 1 | 1 | 1 | | | | |
| | B | | | | | | | | 1 | | | |
| | C | | | | | | | | | 1 | | |
| | D | | | | | | | | | | 1 | |
| | E | | | | | | | | | | | 1 |
| | N-(Cyclohexylthio)phthalimide | | 0.3 | 0.6 | | 0.15 | 0.3 | 0.3 | 0.3 | 0.3 | 0.3 | 0.3 |
| | Bismaleimide F | | | | 1.5 | 0.6 | 0.3 | | 0.3 | 0.3 | 0.3 | 0.3 |
| | G | | | | | | | 0.3 | | | | |
| Rubber properties | Scorch time (min.) | 19.5 | 27.2 | 36.3 | 24.2 | 32.4 | 35.3 | 34.8 | 36.2 | 35.2 | 35.8 | 34.9 |
| | Resilience (%) | 65 | 63 | 61 | 66 | 66 | 66 | 66 | 66 | 66 | 66 | 66 |
| | Heat build-up temperature (°C.) | 38 | 40 | 43 | 37 | 36 | 37 | 37 | 37 | 37 | 37 | 37 |
| | 60° C. tan δ | 0.068 | 0.072 | 0.080 | 0.067 | 0.063 | 0.065 | 0.068 | 0.068 | 0.069 | 0.069 | 0.068 |
| | Dynamic-to-static modulus ratio | 2.15 | 2.22 | 2.32 | 2.34 | 2.11 | 2.13 | 2.15 | 2.16 | 2.14 | 2.18 | 2.19 |
| | $M_{300}$ (kg/cm2) | 155 | 151 | 148 | 172 | 158 | 157 | 158 | 157 | 159 | 161 | 160 |
| | Blooming | o | o | x | o | o | o | o | o | o | o | o |

EXAMPLE 3

| [Compounding Formulation] | |
|---|---|
| Natural rubber | 100 parts |
| FEF black | 45 parts |
| Stearic acid | 3 parts |
| Zinc oxide | 5 parts |
| Antioxidant (N-Phenyl-N'-1,3-dimethylbutyl- | 2 parts | shown in the above formulation at a temperature of 60° to 70° C. A part of the kneaded mixture was subjected to the Mooney scorching test as mentioned in Example 1.

On the other hand, the kneaded mixture was vulcanized with a vulcanizing pres at 145° C. for 25 minutes, and thereafter the vulcanized rubber was subjected to the same tests as mentioned in Example 1 other than the Mooney scorching. The test results are summarized in Table 3.

TABLE 3

| | | Run No. | | | | | | | | | | |
|---|---|---|---|---|---|---|---|---|---|---|---|---|
| | | Comparison | | | | Invention | | | | | | |
| | | 23 | 24 | 25 | 26 | 27 | 28 | 29 | 30 | 31 | 32 | 33 |
| Blend (part) | Dinitrodiamine A | 1 | 1 | 1 | 1 | 1 | 1 | 1 | | | | |
| | B | | | | | | | | 1 | | | |
| | C | | | | | | | | | 1 | | |
| | D | | | | | | | | | | 1 | |
| | E | | | | | | | | | | | 1 |
| | 2,3,5,6-Tetra-chloro-1,4-benzoquinone | | | | 4 | 0.3 | 1 | 0.3 | 0.3 | 0.3 | 0.3 | 0.3 |
| | N-(Cyclohexyl-thio)phthal-imide | | 0.3 | 0.6 | | | | 0.3 | | | | |
| Rubber proper-ties | Scorch time (min.) | 9.5 | 12.0 | 18.4 | 24.2 | 17.0 | 20.2 | 20.4 | 16.4 | 17.2 | 16.2 | 17.0 |
| | Resilience (%) | 74 | 73 | 72 | 76 | 75 | 76 | 75 | 75 | 74 | 74 | 75 |
| | Heat build-up temperature (°C.) | 24 | 25 | 26 | 23 | 24 | 23 | 24 | 23 | 24 | 23 | 24 |
| | 60° C. tan δ | 0.101 | 0.110 | 0.122 | 0.081 | 0.085 | 0.080 | 0.090 | 0.082 | 0.084 | 0.086 | 0.088 |
| | Dynamic-to-static modulus ratio | 1.63 | 1.68 | 1.77 | 1.64 | 1.60 | 1.58 | 1.61 | 1.60 | 1.63 | 1.62 | 1.61 |
| | $M_{300}$ (kg/cm2) | 150 | 145 | 142 | 128 | 150 | 151 | 149 | 149 | 151 | 150 | 151 |
| | Blooming | ○ | ○ | x | ○ | ○ | ○ | ○ | ○ | ○ | ○ | ○ |

EXAMPLE 4

[Compounding Formulation]

| | |
|---|---|
| Natural rubber | 70 parts |
| Polybutadiene rubber (BR-01) | 30 parts |
| HAF black | 45 parts |
| Stearic acid | 3 parts |
| Aromatic process oil | 5 parts |
| Zinc oxide | 5 parts |
| Antioxidant (2,2,4-Trimethyl-1,2-dihydroquinoline polymer) | 2 parts |
| Vulcanization accelerator (N-t-Butyl-2-benzothiazylsulfenamide) | 1 part |
| Sulfur | 2 parts |
| Dinitrodiamine compound 2,3,5,6-Tetrachloro-1,4-benzoquinone N-(Cyclohexylthio)phthalimide | Shown in Table 4 |

Based on the above compounding formulation in which the basal rubber was a blend of the natural rubber with the polybutadiene, the same experiment as in Example 3 was carried out, but the vulcanization was effected at 155° C. for 30 minutes. The test results are summarized in Table 4.

TABLE 4

| | | Run No. | | | | | | | | | | |
|---|---|---|---|---|---|---|---|---|---|---|---|---|
| | | Comparison | | | | Invention | | | | | | |
| | | 34 | 35 | 36 | 37 | 38 | 39 | 40 | 41 | 42 | 43 | 44 |
| Blend (part) | Dinitrodiamine A | 1 | 1 | 1 | 1 | 1 | 1 | 1 | | | | |
| | B | | | | | | | | 1 | | | |
| | C | | | | | | | | | 1 | | |
| | D | | | | | | | | | | 1 | |
| | E | | | | | | | | | | | 1 |
| | 2,3,5,6-Tetra-chloro-1,4-benzoquinone | | | | 4 | 0.3 | 1 | 0.3 | 0.3 | 0.3 | 0.3 | 0.3 |
| | N-(Cyclohexyl-thio)phthal-imide | | 0.3 | 0.6 | | | | 0.3 | | | | |
| Rubber proper-ties | Scorch time (min.) | 20.4 | 28.2 | 37.4 | 40.4 | 29.2 | 42.2 | 43.4 | 29.4 | 29.8 | 29.6 | 29.3 |
| | Resilience (%) | 74 | 73 | 72 | 75 | 74 | 75 | 74 | 74 | 74 | 74 | 74 |
| | Heat build-up temperature (°C.) | 22 | 20 | 18 | 24 | 23 | 24 | 24 | 24 | 23 | 24 | 23 |
| | 60° C. tan δ | 0.062 | 0.070 | 0.081 | 0.052 | 0.055 | 0.055 | 0.054 | 0.053 | 0.056 | 0.053 | 0.054 |
| | Dynamic-to-static modulus ratio | 2.11 | 2.21 | 2.42 | 2.08 | 2.01 | 1.98 | 2.03 | 2.04 | 2.04 | 2.02 | 2.04 |
| | $M_{300}$ (kg/cm2) | 142 | 138 | 132 | 130 | 144 | 145 | 142 | 143 | 144 | 142 | 143 |
| | Blooming | ○ | ○ | x | ○ | ○ | ○ | ○ | ○ | ○ | ○ | ○ |

EXAMPLE 5

[Compounding Formulation]

| | |
|---|---|
| Styrene-butadiene copolymer rubber (SBR 1500) | 100 parts |
| HAF black | 45 parts |
| Stearic acid | 3 parts |
| Zinc oxide | 5 parts |
| Aromatic process oil | 3 parts |
| Antioxidant (N-Phenyl-N'-1,3-dimethylbutyl-p-phenylenediamine) | 2 parts |

| [Compounding Formulation] | |
|---|---|
| Vulcanization accelerator (N-Cyclohenyl-2-benzothiazylsulfenamide) | 1 part |
| Sulfur | 2 parts |
| Dinitrodiamine compound | Shown in Table 5 |
| 2,3,5,6-Tetrachloro-1,4-benzoquinone | |

Using a 250 ml Laboplastomill manufactured by Toyo Seiki Co. as a Bumbury's mixer, the dinitrodiamine compound, carbon black, stearic acid, process oil and zinc oxide were charged into the basal styrene-butadiene copolymer rubber in accordance with the above compounding formulation at an oil bath temperature of 170° C., and the mixture was kneaded for 5 minutes with a mixer revolution of 60 rpm. The rubber temperature was 150° to 160° C. at the kneading.

The rubber blend was then transferred to an open mill and kneaded while adding thereto the 2,3,5,6-tetrachloro-1,4-benzoquinone, antioxidant, vulcanization accelerator and sulfur shown in the above formulation at a temperature of 60° to 70° C. A part of the kneaded mixture was subjected to a Mooney scorching test as mentioned below.

On the other hand, the kneaded mixture was vulcanized with a vulcanizing press at 170° C. for 25 minutes, and thereafter the vulcanized rubber was subjected to the below-mentioned various tests other than the Mooney scorching. The test results are summarized in Table 5.

The test methods are as follows:

(1) Mooney Scorching

A rubber blend before vulcanization was tested in accordance with JIS K-6300, and the time required for increasing in 5 points from the lowest value at 135° C. was determined as a scorch time.

(2) Resilience

It was determined by using a Lüpke type tester.

(3) Heat Build-Up Resistance

It was tested in accordance with ASTM D-623-58. Thus, a Goodrich type heat build-up tester was used under a load of 35 lbs., a stroke of 6.35 mm, a frequency of 1800 rpm and a chamber temperature of 40° C., and a heat build-up temperature was determined with the difference between the initial rubber temperature and the rubber temperature after 40 minutes.

(4) 60° C. tan δ (loss factor)

It was determined under a static load of 100 g, a frequency of 10 Hz and a temperature of 60° C., using a viscoelasticity spectrometer manufactured by Iwamoto Seisakusho Co. The smaller value mean the lower rolling resistance.

(5) Tensile Stress ($M_{300}$)

It was determined in accordance with JIS K-6301 by using a dumbbell specimen.

TABLE 5

| | | Run No. | | | | | | | | | |
|---|---|---|---|---|---|---|---|---|---|---|---|
| | | Comparison | | | Invention | | | | | | |
| | | 45 | 46 | 47 | 48 | 49 | 50 | 51 | 52 | 53 | 54 |
| Blend (part) | Dinitrodiamine | | | | | | | | | | |
| | A | | 2 | | 2 | 2 | 2 | | | | |
| | B | | | | | | | 2 | | | |
| | C | | | | | | | | 2 | | |
| | D | | | 2 | | | | | | 2 | |
| | E | | | | | | | | | | 2 |
| | 2,3,5,6-Tetrachloro-1,4-benzoquinone | | | | 0.1 | 0.3 | 1 | 0.3 | 0.3 | 0.3 | 0.3 |
| Rubber properties | Scorch time (min.) | 22.5 | 18.0 | 16.1 | 21.0 | 22.0 | 22.6 | 21.5 | 21.8 | 21.0 | 22.1 |
| | Resilience (%) | 53 | 58 | 57 | 62 | 64 | 66 | 61 | 60 | 62 | 60 |
| | Heat build-up temperature (°C.) | 25 | 20 | 21 | 16 | 15 | 16 | 17 | 16 | 16 | 18 |
| | 60° C. tan δ | 0.130 | 0.120 | 0.121 | 0.111 | 0.104 | 0.099 | 0.108 | 0.110 | 0.113 | 0.115 |
| | $M_{300}$ (kg/cm²) | 130 | 140 | 142 | 140 | 140 | 145 | 139 | 141 | 142 | 141 |

EXAMPLE 6

| [Compounding Formulation] | |
|---|---|
| Styrene-butadiene copolymer rubber (SBR 1500) | 70 parts |
| Natural rubber (RSS#1) or Polybutadiene rubber (BR-01) | 30 parts |
| HAF black | 45 parts |
| Stearic acid | 3 parts |
| Aromatic process oil | 5 parts |
| Zinc oxide | 5 parts |
| Antioxidant (2,2,4-Trimethyl-1,2-dihydroquinoline polymer) | 2 parts |
| Vulcanization accelerator (N-t-Butyl-2-benzothiazylsulfenamide) | 1 part |
| Sulfur | 2 parts |
| Dinitrodiamine compound | Shown in Table 6 |
| 2,3,5,6-Tetrachloro-1,4-benzoquinone | |

Based on the above compounding formulation in which the basal rubber was a blend of the styrene-butadiene copolymer rubber with the natural rubber or polybutadiene rubber, the same experiment as in Example 5 was carried out, but the vulcanization was effected at 155° C. for 50 minutes. The test results are summarized in Table 6.

TABLE 6

| | | Run No. | | | | | | | | | |
|---|---|---|---|---|---|---|---|---|---|---|---|
| | | Comparison | | | | | | Invention | | | |
| | | 55 | 56 | 57 | 58 | 59 | 60 | 61 | 62 | 63 | 64 |
| Blend (part) | Rubber kind | | | | | | | | | | |
| | Styrene-butadiene copolymer rubber | 70 | 70 | 70 | 70 | 70 | 70 | 70 | 70 | 70 | 70 |
| | Natural rubber | 30 | | 30 | 30 | | | 30 | 30 | | |
| | Polybutadiene rubber | | 30 | | | 30 | 30 | | | 30 | 30 |
| | Dinitrodiamine | | | | | | | | | | |
| | A | | 2 | | 2 | | 2 | | 2 | | |
| | D | | | 2 | | 2 | | 2 | | 2 | 2 |
| | 2,3,5,6-Tetrachloro-1,4-benzoquinone | | | | | | | 0.3 | 0.3 | 0.3 | 0.3 |
| Rubber properties | Scorch time (min.) | 22.1 | 21.9 | 15.0 | 15.3 | 17.0 | 16.5 | 21.5 | 22.0 | 21.5 | 21.8 |
| | Resilience (%) | 55 | 54 | 63 | 64 | 58 | 58 | 67 | 68 | 65 | 63 |
| | Heat build-up temperature (°C.) | 24 | 25 | 17 | 16 | 20 | 20 | 13 | 12 | 15 | 16 |
| | 60° C. tan δ | 0.125 | 0.129 | 0.110 | 0.112 | 0.110 | 0.108 | 0.098 | 0.100 | 0.098 | 0.097 |
| | $M_{300}$ (kg/cm$^2$) | 132 | 130 | 140 | 142 | 138 | 135 | 142 | 145 | 139 | 135 |

According to the present invention, there is provided a rubber composition stable in its scorching and excellent in dynamic properties. Thus, the rubber composition of the present invention is stable in the scorching, and further its resilience, heat build up resistance, 60° C. tan δ and dynamic-to-static modulus ratio are maintained at an excellent level. Therefore, when the rubber composition is applied to a tire part, for example, to a tread in the tire, the fuel consumption of the mobil can be lowered and the durability of the tire can be increased, and hence improvements in economy are expected by the extention of running life. Moreover, when the rubber composition of the present invention is applied to a rubber vibration isolator, vibration and noise can be decreased, and thus, for example, the automobiles on which such rubber vibration isolator is mounted are expected to be improved in the riding comfortableness.

What is claimed is:

1. A rubber composition comprising a base rubber of a natural and/or synthetic rubber, carbon black and, based on 100 parts by weight of the base rubber, from 0.1 to 10 parts by weight of a dinitrodiamine compound represented by the formula [I],

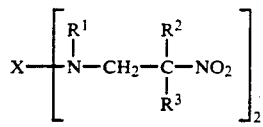

wherein X is a divalent aliphatic, alicyclic or aromatic group which may contain halogen or oxygen in the group, R$^1$ is hydrogen or an aliphatic, aliyclic or aromatic group, provided that two nitrogen atoms linking through X may further link through R$^1$ when both X and R$^1$ are the aliphatic groups, and R$^2$ and R$^3$ independently of one another are each hydrogen or an alkyl of 1 to 12 carbon atoms, provided that R$^2$ and R$^3$ may conjointly form a ring, in combination with the following components (A) or (B):

(A) from 0.05 to 0.3 part by weight of N-(cyclohexylthio)phthalimide and from 0.05 to 1 part by weight of a bismaleimide compound represented by the formula [II],

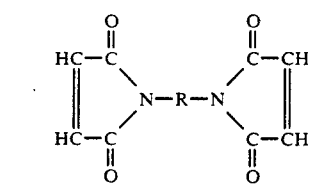

wherein R is a divalent aliphatic, alicyclic or aromatic group which may contain a hetero atom in the group, or (B) from 0.1 to 3 parts by weight of 2,3,5,6-tetrachloro-1,4-benzoquinone.

2. The rubber composition according to claim 1, wherein the base rubber is a natural rubber or a blend mainly composed of a natural rubber and compounded with a synthetic rubber.

3. The rubber composition according to claim 1, wherein the base rubber is styrene-butadiene copolymer rubber or a blend mainly composed of styrene-butadiene copolymer rubber and compounded with a natural rubber or with butadiene rubber, and the component (B) is present.

4. The rubber composition according to claim 1, wherein the carbon black is present in an amount of from about 10 to about 150 parts by weight based on 100 parts by weight of the base rubber.

5. The rubber composition according to claim 1, wherein X in the formula [I] is an aliphatic group of 4 to 12 carbon atoms.

6. The rubber composition according to claim 1, wherein X in the formula [I] is phenylene or

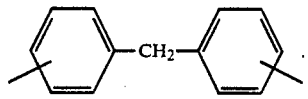

7. The rubber composition according to claim 1, wherein R$^1$ in the formula [I] is hydrogen.

8. The rubber composition according to claim 1, wherein R$^2$ and R$^3$ in the formula [I] are both methyl.

9. The rubber composition according to claim 1, wherein the dinitrodiamine compound is represented by the formula [I] in which X is an alkylene of 4 to 12 carbon atoms, $R^1$ is hydrogen, $R^2$ is methyl and $R^3$ is methyl.

10. The rubber composition according to claim 1, wherein the dinitrodiamine compound is present in an amount of from about 0.2 to about 3 parts by weight based on 100 parts by weight of the base rubber.

11. The rubber composition according to claim 1, which comprises a base rubber of a natural and/or synthetic rubber, carbon black and, based on 100 parts by weight of the base rubber, 0.1 to 10 parts by weight of a dinitrodiamine compound represented by the formula [I], 0.05 to 0.3 part by weight of N-(cyclohexylthio)phthalimide, and 0.05 to 1 part by weight of a bismaleimide compound represented by the formula [II].

12. The rubber composition according to claim 11, wherein R in the formula [II] is an aromatic group of 6 to 8 carbon atoms.

13. The rubber composition according to claim 11, wherein R in the formula [II] is an aliphatic group of 4 to 8 carbon atoms.

14. The rubber composition according to claim 1, which comprises a base rubber of a natural and/or synthetic rubber, carbon black and, based on 100 parts by weight of the base rubber, 0.1 to 10 parts by weight of the dinitrodiamine compound represented by the formula [I], and 0.1 to 3 parts by weight of 2,3,5,6-tetrachloro-1,4-benzoquinone.

15. The rubber composition according to claim 14, which further comprises a scorch retarder.

16. An automobile tire prepared from the composition of claim 1.

17. The automobile tire according to claim 16, wherein the composition is used as a tread material.

18. A rubber vibration isolator prepared from the composition of claim 1.

* * * * *